(12) United States Patent
Allen

(10) Patent No.: US 7,341,143 B2
(45) Date of Patent: Mar. 11, 2008

(54) STORAGE DEVICE FOR DISK MEDIA WITH A CYLINDER CLOSING MEANS

(76) Inventor: David Allen, 5230 Folsom Blvd., Sacramento, CA (US) 95819

( * ) Notice: Subject to any disclaimer, the term of this patent is extended or adjusted under 35 U.S.C. 154(b) by 246 days.

(21) Appl. No.: 11/173,517

(22) Filed: Jul. 2, 2005

(65) Prior Publication Data

US 2006/0042974 A1    Mar. 2, 2006

Related U.S. Application Data

(60) Provisional application No. 60/605,852, filed on Aug. 28, 2004.

(51) Int. Cl.
*B65D 85/57* (2006.01)
*B65D 43/18* (2006.01)

(52) U.S. Cl. .................. 206/308.1; 206/309; 220/252; 220/253; 220/835

(58) Field of Classification Search ............. 206/308.1, 206/309; 220/213, 252–254.9, 502, 825, 220/835
See application file for complete search history.

(56) References Cited

U.S. PATENT DOCUMENTS

| | | | | |
|---|---|---|---|---|
| 1,638,360 A | * | 8/1927 | Olson | 220/252 |
| 1,912,598 A | * | 6/1933 | Snadden | 220/502 |
| 2,478,621 A | * | 8/1949 | Attula | 220/213 |
| 4,207,982 A | * | 6/1980 | Maxwell et al. | 220/252 |
| 4,253,568 A | * | 3/1981 | Long et al. | 220/835 |
| 4,721,393 A | * | 1/1988 | Kwast | 220/502 |
| 5,540,341 A | * | 7/1996 | Holley et al. | 220/253 |
| 5,603,404 A | * | 2/1997 | Nazare et al. | 220/254.3 |
| 6,206,186 B1 | | 3/2001 | Cerda-Villaplana et al. | |
| 6,811,026 B2 | | 11/2004 | Chung | |
| 6,863,176 B2 | | 3/2005 | Farrar et al. | |
| 6,874,626 B2 | | 4/2005 | Lew et al. | |
| 2002/0157973 A1 | * | 10/2002 | Preisler | 206/308.1 |

* cited by examiner

*Primary Examiner*—Bryon P Gehman
(74) *Attorney, Agent, or Firm*—Patel & Alumit, PC; Edwin Tarver; Ty Ung

(57) ABSTRACT

An openable and closeable media case comprising a case with grooves on its interior sides that suspend a disk stored in the case, and a rotating cylindrical closure that secures a disk within the case. The case opens and by the rotating cylindrical closure. A slot in the cylinder comprising matching grooves guides disks into the case. A locking means on the cylinder holds the cylinder in a closed position.

7 Claims, 5 Drawing Sheets

STORAGE DEVICE FOR DISK MEDIA WITH A CYLINDER CLOSING MEANS

CROSS-REFERENCE TO RELATED APPLICATIONS

This application claims the benefit of Provisional application Ser. No. 60/605,852, filed Aug. 28, 2004.

FEDERALLY SPONSORED RESEARCH

Not Applicable

SEQUENCE LISTING OR PROGRAM

Not Applicable

FIELD OF THE INVENTION

The present invention relates generally to the field of storage, and more specifically, to a case for storing and transporting devices, such as CD's and DVD's, in disk form. The present invention is also directed to methods and systems of providing easy access to the storage devices for quick and convenient placement and removal.

BACKGROUND OF THE INVENTION

Storage devices in disk form, such as CD's and DVD's, allow storage of an enormous amount of information ranging from computer programs to audio and visual media. These devices contain optical surfaces through which laser beams reflect and are converted into data signals. The optical surfaces are sensitive, and small scratches, dust, or fingerprints can render them unreadable by laser beams, thereby adversely affecting the playback performance. Improper storage is frequently the cause of such damage to these devices.

The necessity of protecting and storing digital memory devices in disk form has been previously addressed using protective enclosures commonly known as jewel cases. However, jewel cases have several drawbacks: They often consist of several pieces and commonly utilize a hinge to open the case. The hinge frequently fails after repeated or vigorous use, or if the case is dropped, and the pieces separate freely. Moreover, jewel cases do not quickly and conveniently open for placement of the disk to and from the case. Additionally, jewel cases and most other similar devices are relatively thick when measured from front side to back side, and thus take up a large amount of space when multiple cases are stored next to each other. This decreases the ability to conveniently store and transport media.

In order to overcome the abovementioned difficulties, CD's, DVD's and similar devices are commonly put in paper fiber, or synthetic envelopes. The advanced materials used in these cases, and the plastic coating placed over the surface of the optical disks protect them from exposure to dust and minor surface disturbances. However, this approach has also has a variety of shortcomings. Most notably, non-rigid storage containers fail to prevent the disks from being severely scratched, broken, bent, chipped or otherwise damaged by accidents or inadvertent abusive handling. This type of damage frequently makes disks unreadable.

U.S. Pat. No. 6,206,186 (Cerda-Vilaplana and Cerda-Torres) discloses a box-shaped disk case comprising a push-button elastic part with elastically deformable lateral branches arranged in one of its covers whereby the top end thereof consists of a peripheral protuberance enabling a disc to fit into the case by means of a central opening. This patent does not provide for easy accessibility of the disks from the case.

U.S. Pat. No. 6,874,626 (Lew and Dewhurst) discloses storage cradle system for compact discs comprising a series of storage cradles rotatably mounted in parallel in a housing. Each cradle consists of a base having outwardly angled vertically upstanding sidewalls, a rear wall and a vertical upstanding front wall. Indented tabs are provided on each of said side walls to keep the disc centered when fully inserted into the cradle. This patent does not address the requirement of safe storage and transportation of the disks.

U.S. Pat. No. 6,863,176 (Farrar, Fraser, and Pijanowski) discloses an apparatus comprising: a base portion; inwardly extending radial arms resiliently cantilevered from the base portion; disk-engaging means at the inner ends of the arms for releasably engaging the central hole of a disk and supporting the center of the disk away from the base portion. Each arm has first pivot means in the region where the arm joins the base portion and second pivot means radially inward thereof. Due to the presence of the second pivot means, the periphery of the base portion also tends to rise when the disk-engaging means is depressed to help in ejecting the disk. This patent also does not provide for quick and easy accessibility to the stored disk.

U.S. Pat. No. 6,811,026 (Chung) discusses a housing device for compact disks. The housing device includes stackable and bookbindable CD trays, each of which has clip pegs with a hole defined at a center portion of each CD tray. A compact disc can be released by pushing a non-data portion thereof through a release opening defined adjoining the hole in each CD tray. Though providing easy accessibility, disks stored in the manner disclosed in the patent are not protected from wear and tear and cannot be transported safely.

In light of these devices and their limitations, there is a need for a storage device for CDs, DVDs and similar devices which is rigid, thin, and allows users to easily access the disk without having to endure to process of removing or placing it. It is additionally important that the storage device prevents damage to the optical readable/recordable surface. Moreover, it is also desirable that the storage device allows long-term storage and convenient shipment of disks. Furthermore, there is a need to provide opportunity to manufacturers and retailers of disks to display a label or include information, such as instructions or other informative material, in the storage device.

SUMMARY

The present invention is an improved case intended to hold and display CDs, DVDs, CDRoms, and similar devices in disk form. The case consists of two parts; first, a cylinder that serves as a means of opening the case and admitting or dispensing a disk, and second is a cuboidal disk holder, to which the cylinder is attached, that serves to hold and protect a disk by means of grooves which allow the disk to reside in the case without the optical surface coming in contact with the storage case.

The cylinder comprises of an elongated member and is attached to the disk holder by means of pins inserted into receptacles in the disk holder. A slot is molded into the cylinder along its length and extends through the cylinder. The edges of the slot are molded so as to contain grooves that match grooves in the disk holder and prevent the surface of the disk from touching the case. The cylinder has gripping ridges at either end or throughout its length to facilitate easy turning of the cylinder when it is attached to the disk holder.

A pair of semi-hemispheric dome-shaped protrusions or nodes are disposed on the surface of the two ends of the cylinder. The nodes are designed to conform to two sets of dimples disposed on the inner surface of the disk holder, where it connects with the extreme edges of the cylinder.

The disk holder consists of a hollow cuboidal case. The case is open at one end, to accommodate the cylinder and inserted compact disks. A pair of grooves, complimentary to the grooves in the slot on the cylinder are disposed along the inside length of the case and accommodate the edges of a disk, allowing the disk to slide into the case while preventing contact between the surfaces of the disk and the case.

The side of the disk holder that accommodates the cylinder is formed with two rounded brackets that extend beyond the faces of the case and hold the cylinder in place. The top face of the disk holder terminates at its leading edge at the junction of the disk holder and the cylinder, and is beveled in the arc of the cylinder. The top face also has two notches located between the rounded brackets of the disk holder and the main portion of its leading edge. These notches are intended to accommodate the gripping ridges of the cylinder when the case is in a closed position. When the case is in an open position, the gripping ridges face away from the disk holder.

Operationally, to store a disk a person engages fingers with the gripping ridges of the closed case, and rotates the cylinder on its axis, until the slot matches up with the grooves in the disk holder. When the slot aligns with the grooves in the disk holder, the cylinder clicks into position and remains there due to the simultaneous nesting of the nodes into the dimples of the disk holder.

A CD, DVD, CD ROM or similar device can then be inserted into the case, matching up the edges of the CD with the grooves on the slot. The case can accommodate a single disk, without touching the surface of the disk. Once the media is completely inserted into the case, the cylinder is rotated back, and clicks into a closed position and remains there due to the nesting of the nodes and the second set of dimples in the disk holder.

FIGURES—REFERENCE NUMERALS

Figure 1:
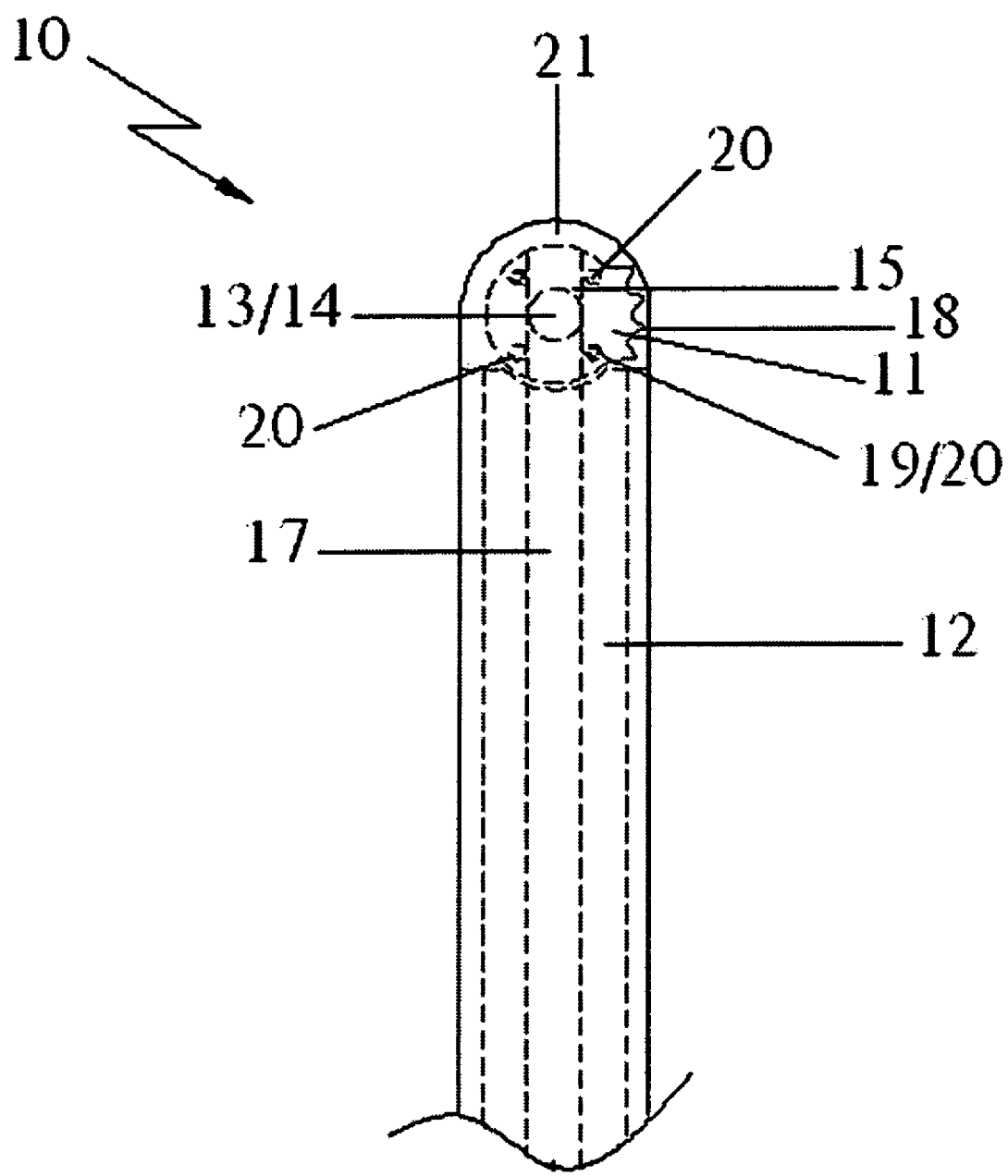
FIG. 1 is an elevational view of the side edge of the case of the present invention, with the revolving enclosure in place.
Figure 2:
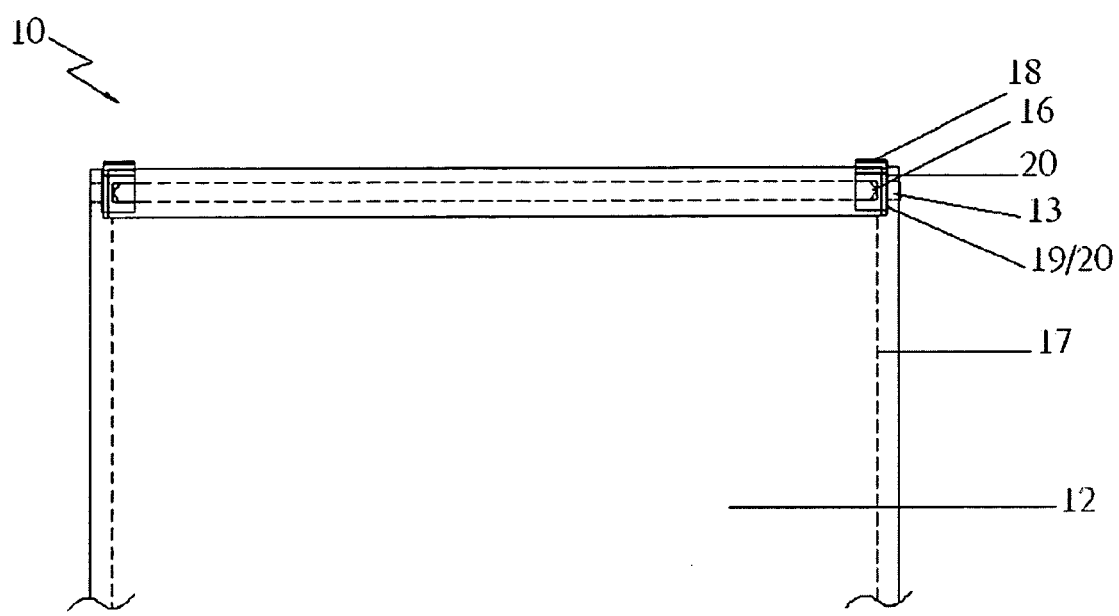
FIG. 2 is an elevational view of the front of the case of the present invention with the rotating closure in place.
Figure 3:
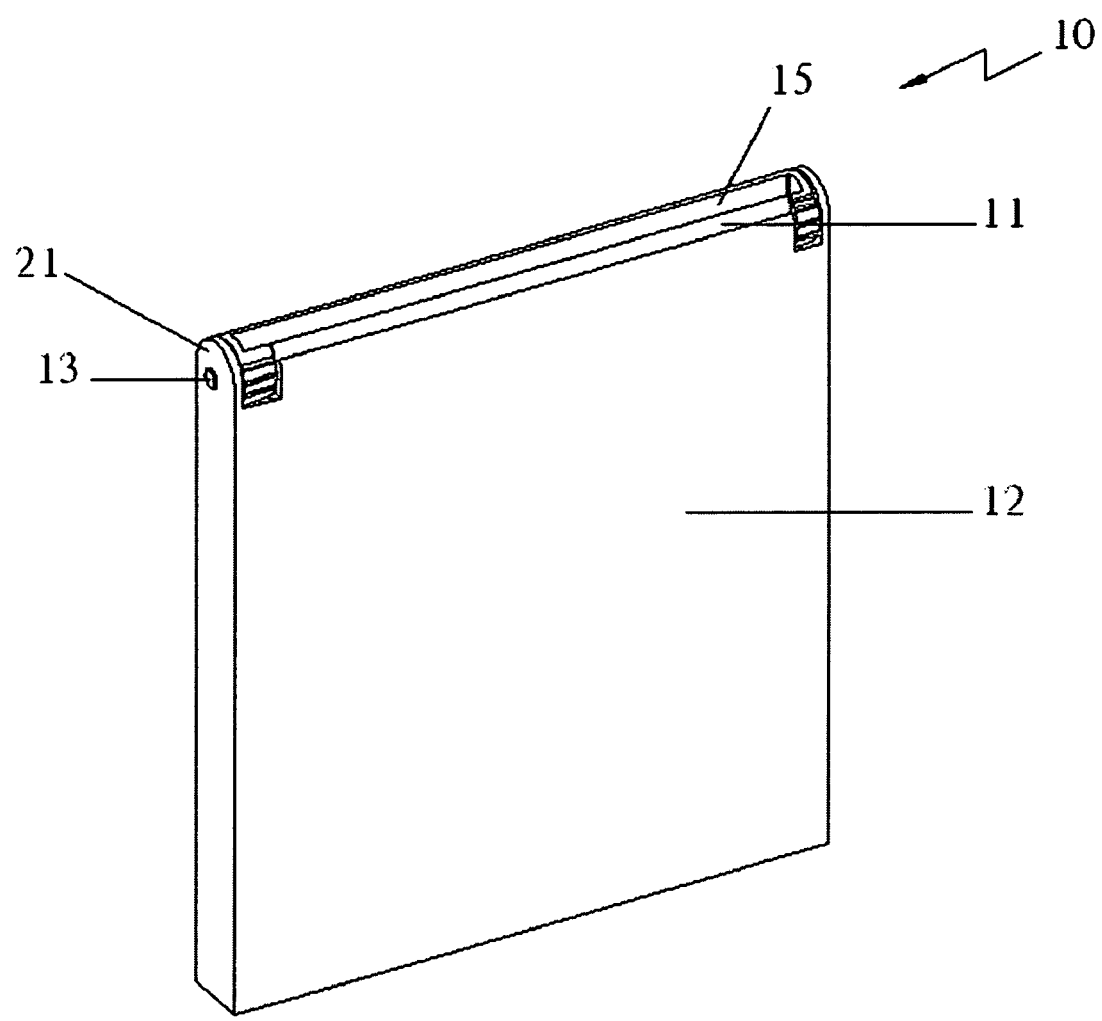
FIG. 3 is a three quarter perspective view of the case of the present invention, with the rotating closure in place.

10 . . . CD Case
11 . . . Cylinder
12 . . . Disk Holder
13 . . . Lugs coming out of Cylinder
14 . . . Receptacles
15 . . . Cylinder Slot
16 . . . Grooves in the Cylinder
17 . . . Grooves in the Disk Holder
18 . . . Gripping Ridges
19 . . . Raised Members
20 . . . Depressions
21 . . . Rounded Brackets of the Disk Holder
22 . . . Notches on the Disk Holder

DETAILED DESCRIPTION OF THE INVENTION

According to FIGS. 1 through 5, this invention concerns an improved case 10 intended to hold and display CDs, DVDs, CDRoms, or other similar devices. The case 10 consists of two parts; first, a cylinder 11 serves as a means for opening the case 10 and admitting or dispensing a disk, and for closing the case 10 and maintaining a disk in a protected environment. The second part of the case 10 is a cuboidal disk holder 12, to which the cylinder 11 is attached that serves to hold and protect a disk.

The cylinder 11 comprises an elongated member preferably approximately 124 cm in length, and 7.8 mm in width. The cylinder 11 has two pins or lugs 13 extending out from either extreme end to act as a rotating means or pivot, and which are inserted into complimentary housings or receptacles 14 in the disk holder 12. The lugs 13 are preferably approximately 3 mm in diameter, and 2 mm in length and are molded into the cylinder 11.

A slot 15 measuring preferably approximately 3 mm in height and 121 mm in length is molded into the cylinder 11 along its length and extends through the cylinder 11. In one preferred embodiment of the present invention, the slot 15 has slightly beveled or rounded edges to help it more easily accommodate disks and to prevent them from touching the sides of the slot 15. The slot 15 is centered along the length of the cylinder 11, leaving approximately 1.5 mm between the edge of the slot 15 and the end of the cylinder 11.

A pair of grooves 16 approximately 2 mm across and approximately 1 mm deep is centered on either side of the slot 15 and serves as means for accommodating the edges of a disk and preventing the surface of the disk from touching or scraping the slot 15 extends through the slot on either side, and corresponds to a complimentary set of grooves 17 disposed laterally along the inside of the disk holder 12.

On one side of the slot 15, a gripping means comprising a raised series of gripping ridges 18 is disposed around preferably one quarter of the outer surface of the cylinder 11. The gripping ridges 18 are approximately 1 mm in height, 6 mm wide, and extend approximately 5 mm inward from each extreme edge of the cylinder 11 in an orientation parallel to the cylinder 11. The gripping ridges 18 facilitate easy turning of the cylinder 11 when it is attached to the disk holder 12 and able to rotate.

A pair of convex raised members 19 are disposed on the ends of the cylinder 11. The raised members 19 are complimentary to concave depressions 20 disposed on the disk holder 12 where it connects with the ends of the cylinder 11.

One set of depressions 20 is oriented so that when the convex raised members 19 are adjacent thereto, the slot 15 allows a disk to be inserted through the cylinder 11 and into the disk holder 12. A second set of depressions 20 is oriented so that when the convex raised members 19 are adjacent thereto, the slot 15 is perpendicular to the opening in the disk holder 12, thereby securing a disk inside the disk holder 12.

The disk holder 12 consists of a cuboidal case, approximately 128 mm by 130 mm by 10.6 mm. The case is open at one end, to accommodate the cylinder 11. A pair of grooves 17, complimentary to the grooves 16 in the slot 15 on the cylinder are disposed along the 131 mm length of the case and accommodate the edges of a disk, allowing the disk to slide into the case 10 while preventing contact between the surfaces of the disk and the case 10.

The side of the disk holder 12 that accommodates the cylinder 11 is formed with two rounded brackets 21 that extend beyond the faces of the disk holder 12. The brackets 21 have rounded semi-circular outward facing edges, in the center of which, two housings or receptacles 14 are disposed to accommodate the lugs 13 of the cylinder 11 and allow it to rotate in the axis of the lugs 13.

Figure 4:
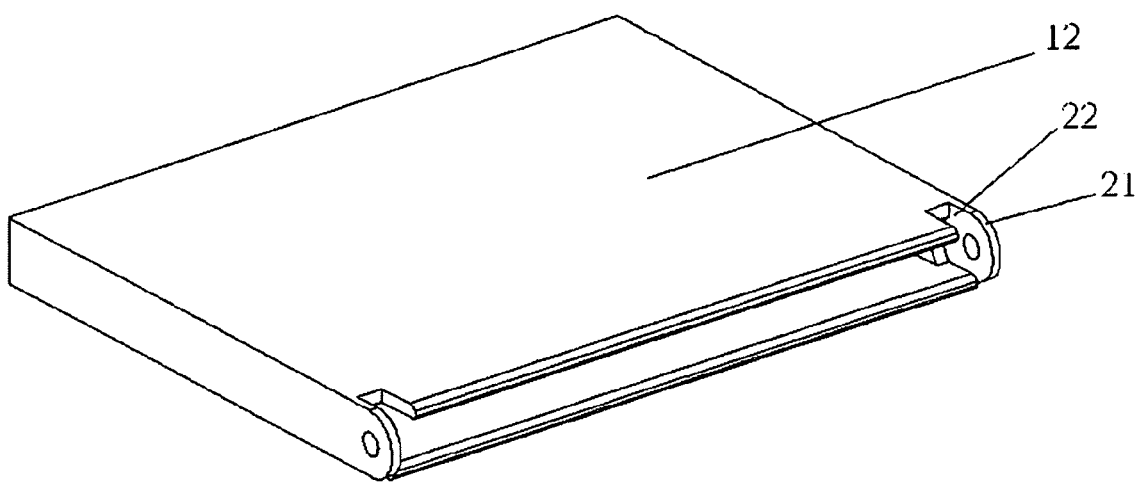
FIG. 4 is a three quarter perspective view of the case of the present invention without the revolving closure in place.
Figure 5:
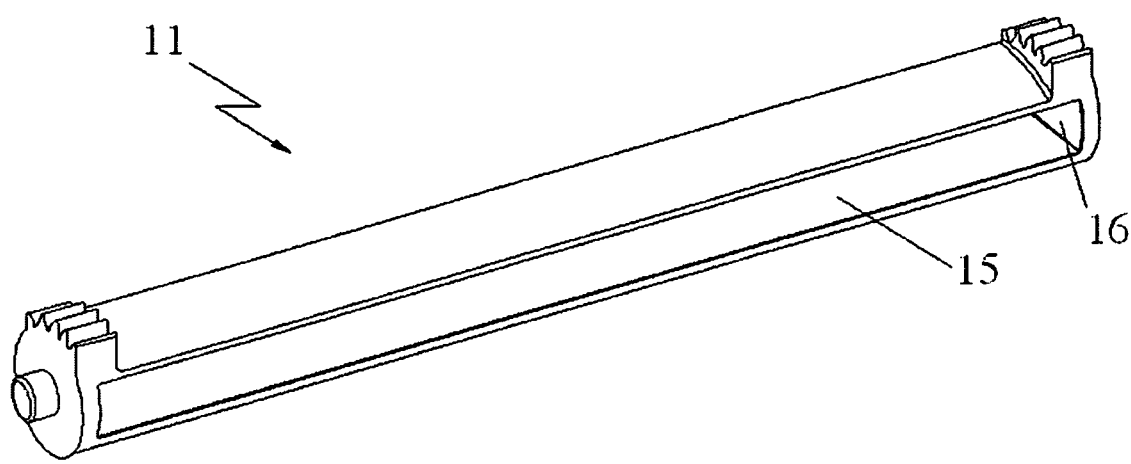
FIG. 5 is a three quarter perspective view of the rotating closure of the present invention.

Referring to FIG. 4, the top face of the disk holder 12 terminates at its leading edge at the junction of the disk holder 12 and the cylinder 11, and in one preferred embodiment of the invention, is beveled in the arc of the cylinder 11.

The top face also has two notches 22 located between the rounded brackets 21 of the disk holder 12 and the main portion of its leading edge. These notches are approximately 5.1 mm wide and are intended to accommodate the gripping ridges 18 of the cylinder 11 when the CD case 10 is in a closed position. When the CD case 10 is in an open position, the gripping ridges 18 face away from the disk holder 12.

Referring to FIG. 4, the bottom face of the disk holder 12 extends past the top face approximately 1 to 1.5 mm, and a small set of notches in the top face approximately 1 mm wide accommodates the gripping ridges 18 at the ends of the cylinder 11. When the case 10 is in a closed position, the slot 15 is oriented toward the bottom face and top face of the disk holder 12. When the case 10 is in an open position, the slot 15 is oriented toward the inner chamber of the disk holder 12.

To operate the case 10 of the present invention, a person places their fingers on the gripping ridges 18 of the closed case, and rotates the cylinder 11 on its axis, until the slot 15 matches up with the grooves 17 in the disk holder 12. When the slot 15 aligns with the disk holder 12, the cylinder 11 will "click" into position and remain there due to the simultaneous nesting of the nodes 19 into the dimples 20 of the disk holder 12.

A CD, DVD, CD ROM or similar device can then be inserted into the case 10, matching up the edges of the CD or similar device with the grooves 16 on the slot 15. The case 10 will accommodate a single disk, without touching the surface of the disk. Once the media is completely inserted into the case 10, the cylinder is rotated back, and will "click" into a closed position and remain there due to the nesting of the nodes 19 and the second set of dimples 20 in the disk holder 12.

In this manner, the CD case of the present invention will store CDs or similar devices, preserving the integrity of the information stored therein, and preventing the disk from becoming scratched or damaged in other ways.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

What is claimed is:

1. A device for storing disk media comprising;
   a flattened cuboid one-piece case comprising an opening;
   a closing means positioned at the opening of the case to close the opening, comprising the closing means a cylinder rotatable about its axis, a slot disposed through the cylinder along the length of the cylinder that allows disk media to pass through the cylinder and into the case when the slot is positioned in alignment with the opening of the case, a means for holding the cylinder in a position to prevent disk media from escaping from the case,
   at least one groove in the case so that only edges of the disk media contact the case and a locking mechanism disposed at the junction of the case and the cylinder to maintain the cylinder in an open position.

2. The device of claim 1, wherein the ends of the cylinder comprise posts that interface with holes at the opening of the case.

3. The device of claim 1, wherein the cylinder is equipped with a fastening means comprising a series of raised members that seat into adjacent indentations so that when the members and indentations are out of alignment, the cylinder can be rotated with force, but is prevented from rotating freely.

4. The device of claim 1, wherein the case contains notches adjacent to the opening of the case to accommodate a gripping mechanism incorporated into, and used to turn the cylinder.

5. The device of claim 4, wherein the gripping mechanism comprises at least one rough area, including raised members with ridges, disposed around at least one part of the cylinder, so that increased traction is created when rotating the cylinder about its axis using the gripping mechanism.

6. The device of claim 1, wherein the locking mechanism comprises at least one raised member, complimentary to at least two depressions, so that when the at least one member seats in one depression, the cylinder remains in an open position, and when the at least one member seats into the other depression, one set of pits, and the cylinder remains in a closed position.

7. A method for storing disk media, wherein a user rotates a cylinder incorporated into a media storage device about the cylindrical axis, to align a slot extending through the cylinder with an opening in the storage device; slides a disk into the storage device, through the slot in the cylinder, and then rotates the cylinder so that the slot in the cylinder is out of alignment with the opening, including perpendicular to the plane of the opening in the storage device.

* * * * *